(12) United States Patent (10) Patent No.: US 12,674,522 B2

Hadley et al. (45) Date of Patent: Jul. 7, 2026

(54) VACUUM VALVE

(71) Applicant: Pfeiffer Vacuum Technology AG, Asslar (DE)

(72) Inventors: Jeff Hadley, Glendale, OR (US); Angel Huerta, Yreka, CA (US); David Crone, Mountain View, CA (US); Randy Regennitter, Yreka, CA (US); Kinte Allen, Yreka, CA (US)

(73) Assignee: Pfeiffer Vacuum Technology AG, Asslar (DE)

( * ) Notice: Subject to any disclaimer, the term of this patent is extended or adjusted under 35 U.S.C. 154(b) by 64 days.

(21) Appl. No.: 18/645,475

(22) Filed: Apr. 25, 2024

(65) Prior Publication Data

US 2025/0334202 A1 Oct. 30, 2025

(51) Int. Cl.
| | |
|---|---|
| *F16K 35/02* | (2006.01) |
| *F16K 27/04* | (2006.01) |
| *F16K 35/00* | (2006.01) |
| *F16K 51/02* | (2006.01) |

(52) U.S. Cl.
CPC ............ *F16K 35/00* (2013.01); *F16K 27/047* (2013.01); *F16K 35/025* (2013.01); *F16K 51/02* (2013.01)

(58) Field of Classification Search
CPC ....... F16K 35/00; F16K 35/022; F16K 35/025
USPC ................................ 251/106, 111
See application file for complete search history.

(56) References Cited

U.S. PATENT DOCUMENTS

| | | | | |
|---|---|---|---|---|
| 1,437,369 A | * | 11/1922 | Tallman | .................... F16K 5/08 |
| | | | | 251/106 |
| 4,763,690 A | | 8/1988 | Martin | |
| 5,213,308 A | * | 5/1993 | Jeromson | ................ F16K 35/06 |
| | | | | 70/180 |

(Continued)

FOREIGN PATENT DOCUMENTS

| | | |
|---|---|---|
| CN | 100504125 C | 6/2009 |
| CN | 207195815 U | 4/2018 |
| CN | 214946507 U | 11/2021 |

OTHER PUBLICATIONS

Extended European Search Report issued Dec. 18, 2024, in corresponding European Patent Application No. 24185148.4, citing documents 1-8 therein, 9 pages.

(Continued)

*Primary Examiner* — Kevin F Murphy

(74) *Attorney, Agent, or Firm* — Oblon, McClelland, Maier & Neustadt, L.L.P.

(57) ABSTRACT

A vacuum valve for a medium-, high- and/or ultra-high vacuum system comprises a valve housing defining a passage connecting a first opening and a second opening of the valve housing, a valve body and a complementary seat, the valve body comprising a valve shaft extending in an axial direction and being actuable to move the valve body between an open position and a closed position, wherein the valve body cooperates with the seat in the closed position so as to close the passage gas-tightly, and a locking unit configured to secure the valve body in a locked position, wherein the locking unit comprises a locking mechanism configured to urge, upon actuation of the locking unit, at least one locking element in a radial direction disposed in a plane perpendicular to the axial direction towards the valve shaft to assume a locking position.

19 Claims, 8 Drawing Sheets

(56)          References Cited

U.S. PATENT DOCUMENTS

| | | | | |
|---|---|---|---|---|
| 5,931,444 | A | * | 8/1999 | Chronister ............. F16K 27/07 |
| | | | | 251/294 |
| 6,352,239 | B1 | | 3/2002 | McIntosh |
| 8,074,959 | B2 | * | 12/2011 | Sledz ................... F16K 35/025 |
| | | | | 251/95 |
| 8,360,391 | B2 | * | 1/2013 | Morris ................... F16K 35/10 |
| | | | | 403/310 |
| 2007/0057119 | A1 | | 3/2007 | McAuley |
| 2015/0053904 | A1 | | 2/2015 | Prisk |
| 2015/0376986 | A1 | | 12/2015 | Taylor et al. |

OTHER PUBLICATIONS

Combined Taiwanese Office Action and Search Report issued Feb. 13, 2026, in corresponding Taiwanese Patent Application No. 114115006 (with English Translation of Category of Cited Documents), 10 pages.

* cited by examiner

<u>Fig. 1A</u>
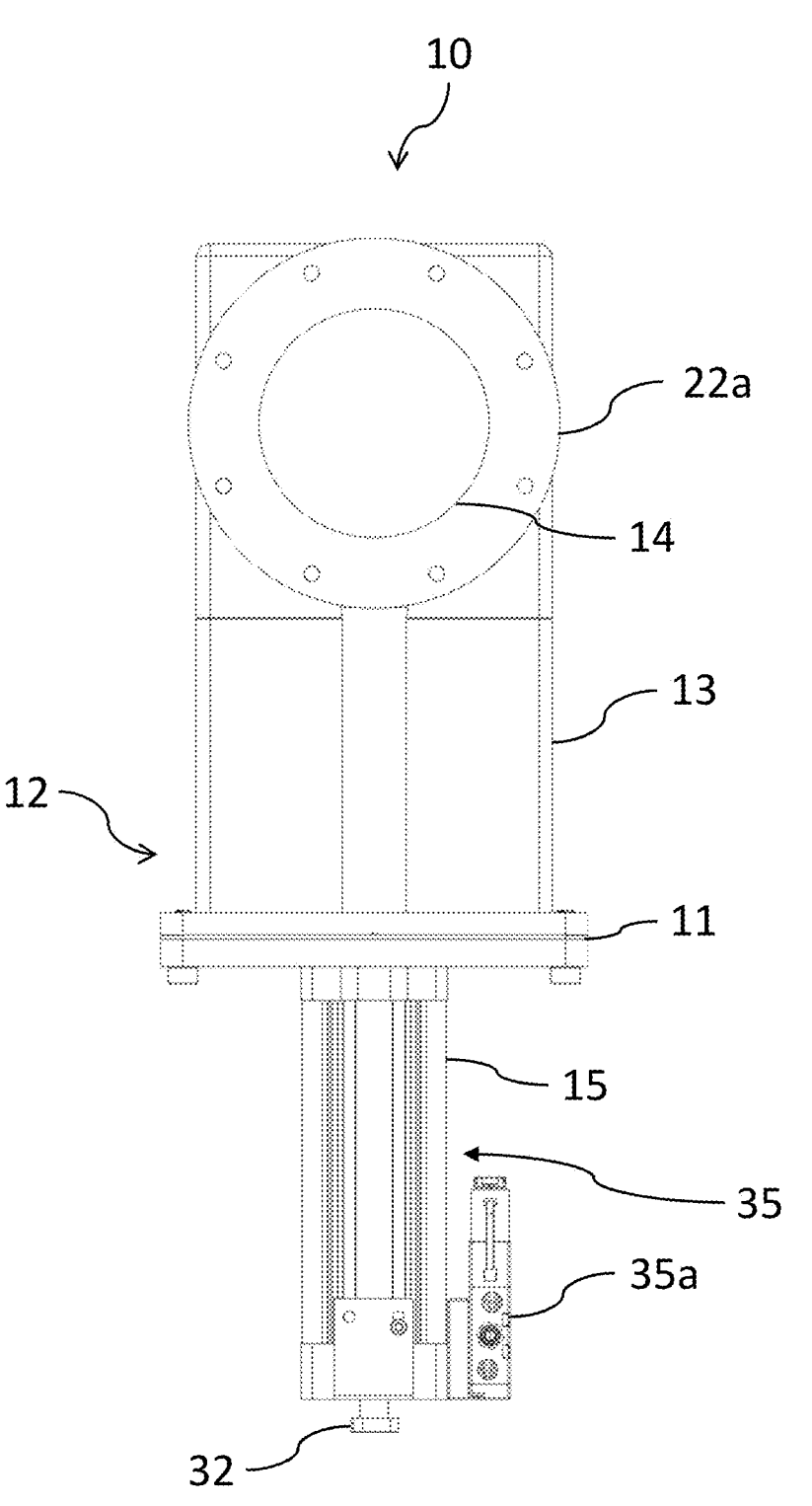

<u>Fig. 3A</u>
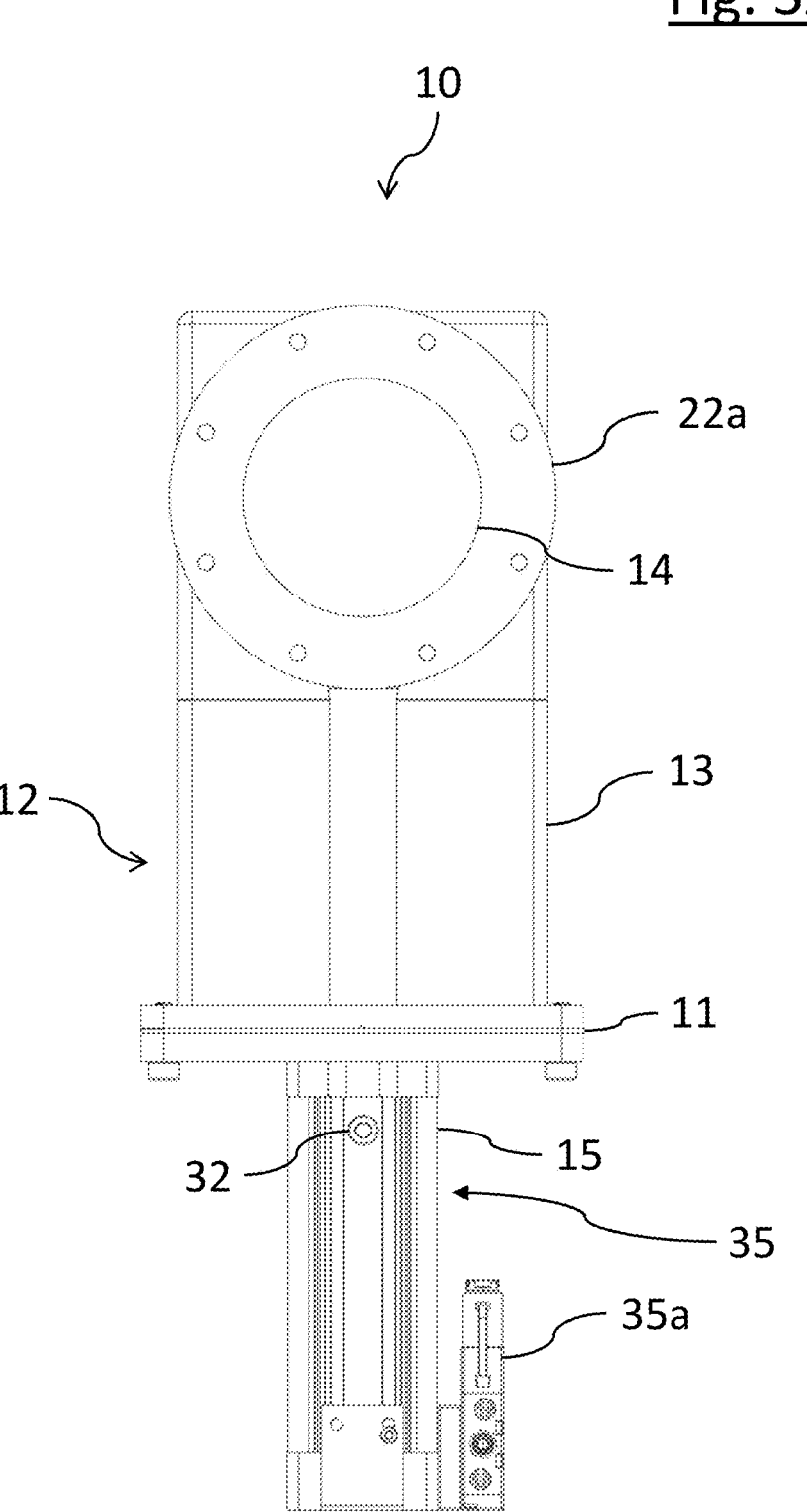

VACUUM VALVE

BACKGROUND OF THE INVENTION

The present invention relates to a vacuum valve for a medium-, high- and/or ultra-high vacuum system.

Medium-, high- and ultra-high vacuum systems are in use in many technological fields and industrial or scientific applications. Such vacuums, which are in particular in the range of 100 to $10^{-9}$ Pa, set very high requirements to the design of the components used in such systems. In particular, valves of such systems must meet high standards as they have to be able to reliably prevent gas leakage when in a closed condition.

Vacuum systems are often subject to occupational safety procedures. In particular during maintenance, storage or transport it is important to reliably secure the system in a defined state. To this end lockout-tagout systems are provided which make sure that all components of the vacuum system that could be dangerous for employees are isolated, locked and labelled. The lockout-tagout systems are in general not used during the intended operation of the vacuum system.

Valves are central components of vacuum system. It is an object of the present invention to provide a vacuum valve that reliably provide the above-mentioned functionality.

SUMMARY OF THE INVENTION

According to an aspect of the present invention, a vacuum valve for a medium-, high- and/or ultra-high vacuum system is provided, the vacuum valve comprising a valve housing defining a passage connecting a first opening and a second opening of the valve housing, a valve body and a complementary seat, the valve body comprising a valve shaft extending in an axial direction and being actuable to move the valve body between an open position and a closed position, wherein the valve body cooperates with the seat in the closed position so as to close the passage gas-tightly. Further, a locking unit is provided that is configured to secure the valve body in a locked position, wherein the locking unit comprises a locking mechanism configured to urge, upon actuation of the locking unit, at least one locking element in a radial direction disposed in a plane perpendicular to the axial direction towards the valve shaft to assume a locking position.

The locking unit enables the valve body to be reliably secured in the locked position. In such a state, a user can for example carry out maintenance on the vacuum system without having to worry about the valve body changing its position. Locking of the valves of a vacuum system might also be important during transport or storage of the system.

Further embodiments are given in the claims, the description and the accompanying drawings.

The valve body may be actuable by a linear or a rotational movement of the valve shaft.

According to one embodiment of the invention, when the valve body is in the locked position, a form-fit connection exists between the locking element and the valve shaft. A form-fit connection is particularly reliable.

In addition or as an alternative, when the valve body is in the locked position, a frictional connection exists between the locking element and the valve shaft. In an embodiment where only a frictional connection is provided, the locking position of the locking element can be freely selected, since no components have to be aligned. In addition, the frictional connection can be released comparatively easily.

According to one embodiment of the invention, the locking element is configured to exert a clamping force on the valve shaft upon being urged towards the valve shaft by the locking mechanism. The clamping force ensures that the valve body is reliably secured in the locked position.

According to one embodiment of the invention, the locking unit is actuable by means of a rotatable actuating element. The actuating element can be configured to be manually operated. For example, the actuating element is a handle or a screw head.

According to one embodiment of the invention, the locking unit comprises a conversion mechanism disposed between the actuating element and the locking mechanism and is configured to convert a rotary movement of the actuating element into a linear movement of the locking mechanism. The linear movement of the locking mechanism can take place in the axial or radial direction. The expression "disposed between" can mean "locally disposed between", i.e. the conversion mechanism is geometrically or spatially located between the actuating element and the locking mechanism, and/or "functionally disposed between", i.e. the conversion mechanism is in the force flow between the actuating element and the locking mechanism. The conversion mechanism ensures efficient energy transfer from the actuating element to the locking mechanism.

For precise adjustment of the position of the locking mechanism, the conversion mechanism may comprise a threaded connection. In particular, the threaded connection makes it possible to convert an amount of movement of the conversion mechanism into a smaller amount of movement of the locking mechanism.

The threaded connection may comprise an actuation shaft with a thread, preferably an external thread. The actuation shaft may have a cylindrical shape.

According to one embodiment of the invention, the actuation shaft and the valve shaft are arranged coaxially.

According to one embodiment of the invention, the locking unit comprises a hollow shaft with a thread that cooperates with the thread of the actuation shaft.

For a particularly slim design, the hollow shaft and the valve shaft may be arranged coaxially. The hollow shaft may be fixedly secured to the valve housing or can be an integral part thereof.

According to one embodiment of the invention, the locking element is urged towards an inner surface portion of the valve shaft by the locking mechanism upon actuation of the locking unit. For example, the locking element comprises at least one, preferably two or more, clamping jaw(s) that is (are) pressed towards the inner surface portion of the valve shaft upon actuation of the locking unit. Such clamping jaws are easily to operate and inexpensive.

According to one embodiment of the invention, for providing a particularly stable locking position, at least a portion of the locking element is moved into a recess disposed on the valve shaft by the locking mechanism upon actuation of the locking unit. For example, the locking element is one or more pin(s) or a cam element that is moved into the recess. The recess can be disposed on an inside of the valve shaft. However, it is also possible to use a design in which the recess is disposed on an outside of the valve shaft.

According to one embodiment of the invention, the locking mechanism comprises at least one inclined surface configured to cooperate with a complementary inclined surface of the locking element. For example, the locking mechanism comprises a conical portion configured to cooperate with a complementary inclined surface of the locking element. The inclined surfaces enable a uniform urging force acting on the locking element.

According to one embodiment of the invention, the locking element is urged towards an outer surface portion of the valve shaft by the locking mechanism upon actuation of the locking unit. This design is particularly compact and cost-effective. For example, the locking element is or comprises a bracket clamp that can be tightened around the valve shaft by operating the actuating element.

According to one embodiment of the invention, the actuation shaft extends in the radial direction, which reduces the axial dimension of the vacuum valve.

According to one embodiment of the invention, the actuation shaft and the valve shaft extend perpendicular to each other.

According to one embodiment of the invention, the locking unit comprises a resetting mechanism configured to move the locking element from the locking position into an unlocking position, in particular to move the locking element in the radial direction away from the valve shaft. The resetting mechanism makes it easier to release the locked position of the valve body. For example, the resetting mechanism comprises an elastic element. The elastic element can be in a prestressed state when the valve body is in the locked position.

According to one embodiment of the invention, at least one component of the locking unit is secured to the valve housing. For example, the hollow shaft is secured to the valve housing.

According to one embodiment of the invention, the locked position corresponds to the open position or the closed position of the valve body. The locked position can be an open position, e.g. to provide access for maintenance, or a closed position, e.g. to maintain the vacuum in the system during maintenance, transport or storage, of the valve body. The locked position can also be an intermediate position.

According to one embodiment of the invention, the vacuum valve comprises an electromechanical actuation unit for actuating the valve body. The actuation unit may comprise an electric motor and a mechanical conversion unit with an input portion drivingly connected with the electric motor and an output portion drivingly connected with the valve body, wherein the mechanical conversion unit converts a rotational output of the electrical motor into a linear movement of the output portion to move the valve body in the axial direction. The output portion may comprise a nut element which is connected to the valve shaft. Such an electromechanical actuation unit can be very compact and allows to convert the electric energy input efficiently into an actuation movement of the valve body.

It is also possible to provided a pneumatic and/or hydraulic actuation unit.

According to one embodiment of the invention, the vacuum valve comprises at least one position sensor for detecting a relative position of the output portion and/or the valve body and/or another component connected to the valve body with respect to the valve housing. Such a sensor allows—inter alia—to provide a closed-loop control as the data provided by said sensor may be used to control the actuation unit.

The position sensor may be an encoder, an optical sensor, a sensor based on the Hall-effect or any other suitable sensor.

Information about the position of the output portion and/or the valve body and/or another component connected to the valve body (e.g. a piston of a hydraulic or pneumatic system) allows to determine and—if necessary—to adapt the corresponding actuation unit. It is also easily possible to place the valve body into desired intermediate positions to control the gas flow dynamics in the vacuum system, e.g. to influence, suppress or enhance pressure-time profiles, pressure spikes, gas velocity, flow induced debris generation and movement and pump inlet pressure.

Instead or in addition to the sensor a passive indicator—e.g. a marking—may be provided. E.g., a transparent window with ruler lines is provided in the valve housing for visually determining the relative position of the valve body, directly and/or indirectly via the position of a component connected to the valve body.

According to one embodiment of the invention, the vacuum valve comprises an active sensor for determining that the valve body is in the locked position. The sensor may be a torque sensor, pressure or any other suitable sensor that is active engagement with the actuating element and/or the valve seat.

BRIEF DESCRIPTION OF THE DRAWINGS

FIG. 1A shows a first embodiment of the vacuum valve.

FIG. 3A shows a third embodiment of the vacuum valve.

DESCRIPTION OF THE PREFERRED EMBODIMENTS

Figure 1B:
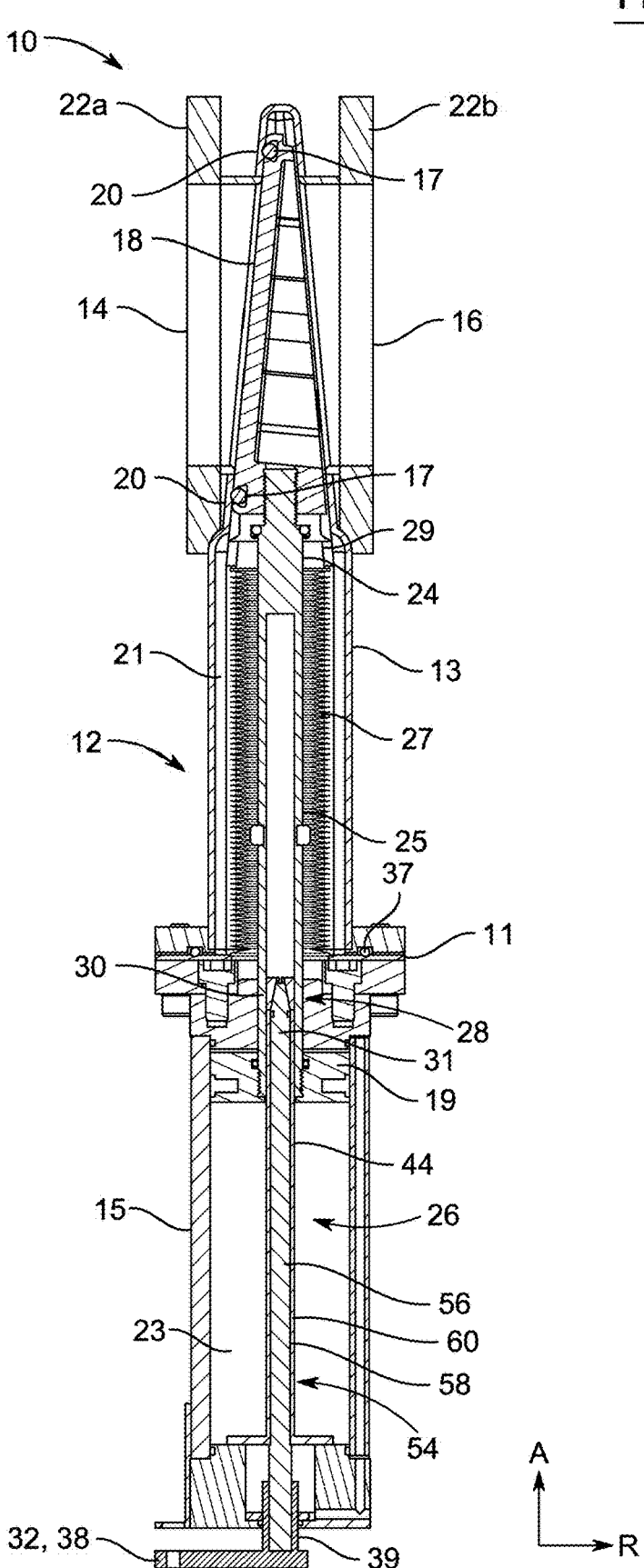
FIG. 1B shows a cross-section of the vacuum valve according to FIG. 1A.

FIGS. 1A and 1B show a vacuum valve 10 according to a first embodiment of the invention. The vacuum valve 10 comprises a valve housing 12, which in turn comprises a top member 13 and a separate bottom member 15 that are gas-tightly connected to each other via a flange connection 11 comprising a seal 37. It is however also conceivable that the valve housing 12 is designed in one piece. The top member 13 defines a passage connecting a first opening 14 and a second opening 16 of the valve 10 (see FIG. 1B). Both openings 14, 16 comprise flange sections 22a, 22b which allow to integrate the vacuum valve 10 into a medium-, high- or ultra-high vacuum system.

The top member 13 further defines a seat 20 for a valve body 18 of the vacuum valve 10. The valve body 18 has a substantially triangular cross-sectional shape and comprises a recess in which a seal 17 is disposed. In the closed position of the valve body 18 shown in FIG. 1B, the seal 17 cooperates with the seat 20 so as to close the first opening 14 and therefore the passage gas-tightly. The seal 17 may be a conventional O-Ring or a so-called "low force seal", i.e. a seal that can be compressed suitably by the application of a relatively small force and/or that has sealing properties already at low forces.

The valve body 18 is screwed onto a valve shaft 24 which extends in an axial direction A. Alternatively, the valve body 18 and the valve shaft 24 are designed in one piece (not shown). The valve shaft 24 comprises a hollow portion 25 which is partially disposed inside a chamber 21 defined by the top portion 13 of the valve housing 12.

The valve shaft 24 is fixed to a piston 19 of an pneumatic actuation unit 35. The piston 19 can be moved in the axial direction A inside a chamber 23 defined by the bottom member 15 of the valve housing, such that the valve shaft 24 is actuable to move the valve body 18 between an open position and the shown closed position. When the valve shaft 24 is moved in the axial direction A by piston 19, a bellows 27 that is supported by an axial projection 29 of the valve shaft 24 and the intermediate member 11 of the valve housing 12 is stretched or compressed. Bellows 27 may have elastic properties that support a closure of valve 10. It even may be envisaged to provide a spring like bellows 27 the automatically shuts valve 10 in case the actuation unit 35 fails.

The vacuum valve 10 comprises a position sensor (not shown) for determining the relative position of the piston 19 with respect to the valve housing 12, and therefore the relative position of the valve body 18. The position sensor may be an encoder, an optical sensor, a sensor based on the Hall-effect or any other suitable sensor. Additionally or alternatively, e.g. a transparent window with markings (also not shown) is provided in the valve housing 12 for visually determining the relative position of the valve body 18.

A distal end 31 of an actuation shaft 56 protrudes into an end of the hollow portion 25 of the valve shaft 24 that is located opposite to the valve body 18. The actuation shaft 56 has a substantially cylindrical shape and comprises an external thread 58 cooperating with an internal thread 60 of a hollow shaft 44 that is secured to the bottom member 15 of the valve housing 12. However, it is also conceivable that the hollow shaft 44 is an integral part of the bottom member 15 of the valve housing 12. The actuation shaft 56, the hollow shaft 44 and the valve shaft 24 are arranged coaxially and extend in the axial direction A.

The actuation shaft 56 can be moved along the axial direction A by means of a rotatable actuating element 32. In the shown example, the actuating element 32 is a handle 38 that can be manually turned about the axial direction A so as to screw the actuation shaft 56 further inside the hollow shaft 44 or away from the hollow shaft 44 due to the interaction of threads 58, 60. The actuation shaft 56 is inserted in a hollow portion 39 of the actuating element 32. It is to be understood that the handle 38 is only an example and that the actuating element 32 may also be realized by an electromechanical element for automatic control of the position of the actuation shaft 56.

Figure 1C:
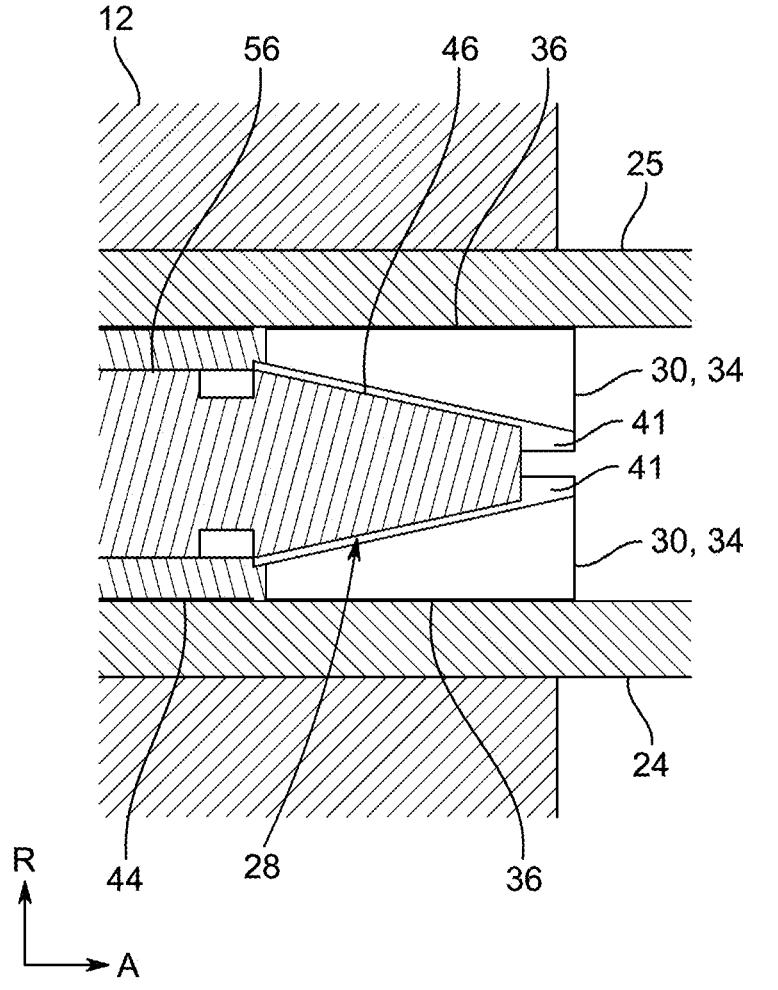
FIG. 1C shows an enlargement of a portion of FIG. 1B.

As can be seen in more detail in FIG. 1C, when the actuation shaft 56 is moved relative to hollow shaft 44 and valve shaft 24 in axial direction A (in FIG. 1C to the right) by operating the actuating element 32, at some point, a conical portion 46 arranged at the distal end 31 of the actuation shaft 56 comes into contact with a complementary inclined surface 41 of a locking element 30. The locking element 30 comprises clamping jaws 34. The clamping jaws 34 and the hollow shaft 44 may be designed in one piece. However, it is also possible that the clamping jaws 34 are separate components that are connected to the hollow shaft 44. The connection between jaws 34 and shaft 44 is such that jaws 34 essentially do not move in the axial direction A relative to shaft 44.

When the actuation shaft 56 is further moved inside the hollow shaft 44 and the valve shaft 24 (not shown), the conical portion 46 urges the clamping jaws 34 in a radial direction R towards an inner surface portion 36 of the hollow portion 25 of the valve shaft 24, such that a frictional connection is created between the clamping jaws 34 and the valve shaft 24. In other words, the locking element 30 is clamped to the valve shaft 24. In this locking position, the frictional connection secures the valve shaft 24—and therefore the valve body 18—to the valve housing 12 via the locking element 30, the actuation shaft 56 and the hollow shaft 44.

Means can be provided for determining an attachment point at which the actuation shaft 56 is moved sufficiently far into (or towards) the valve shaft 24, i.e., to verify the locking position of the locking element 30. For example, for this purpose, the actuating element 32 is equipped with a torque sensor (not shown). An angular position of actuating element 32 relative to housing 12 may also be an indication of the locking/unlocking state of valve body 18.

The actuating element 32, the actuation shaft 56, the hollow shaft 44 and the locking element 30 are part of a locking unit 26, wherein the conical portion 46 of the actuation shaft 56 functions as a locking mechanism 28. The external thread 58 of the actuation shaft 56 together with the internal thread 60 of the hollow shaft 44 form a conversion mechanism 54 for converting a rotary movement of the actuating element 32 into a linear movement of the locking mechanism 28.

Figure 2A:
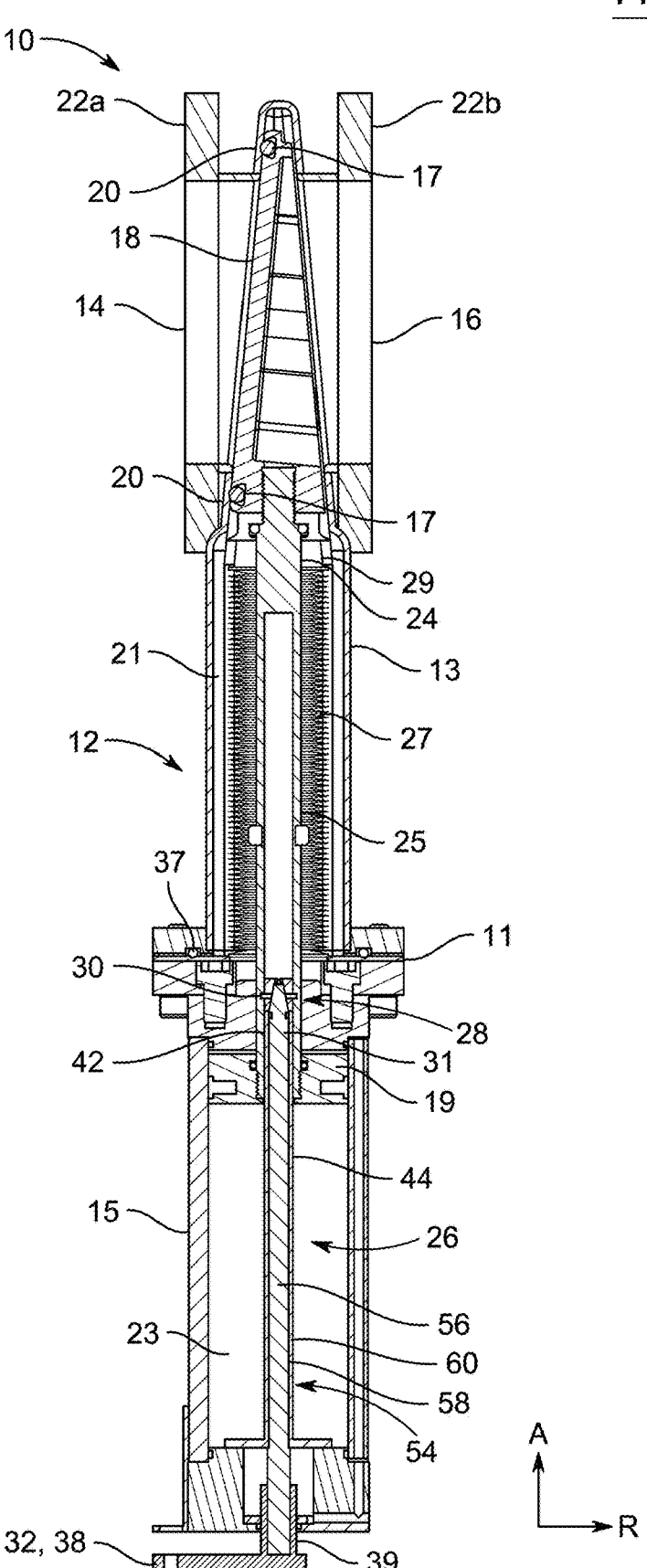
FIG. 2A shows a second embodiment of the vacuum valve in a cross-section.
Figure 2B:
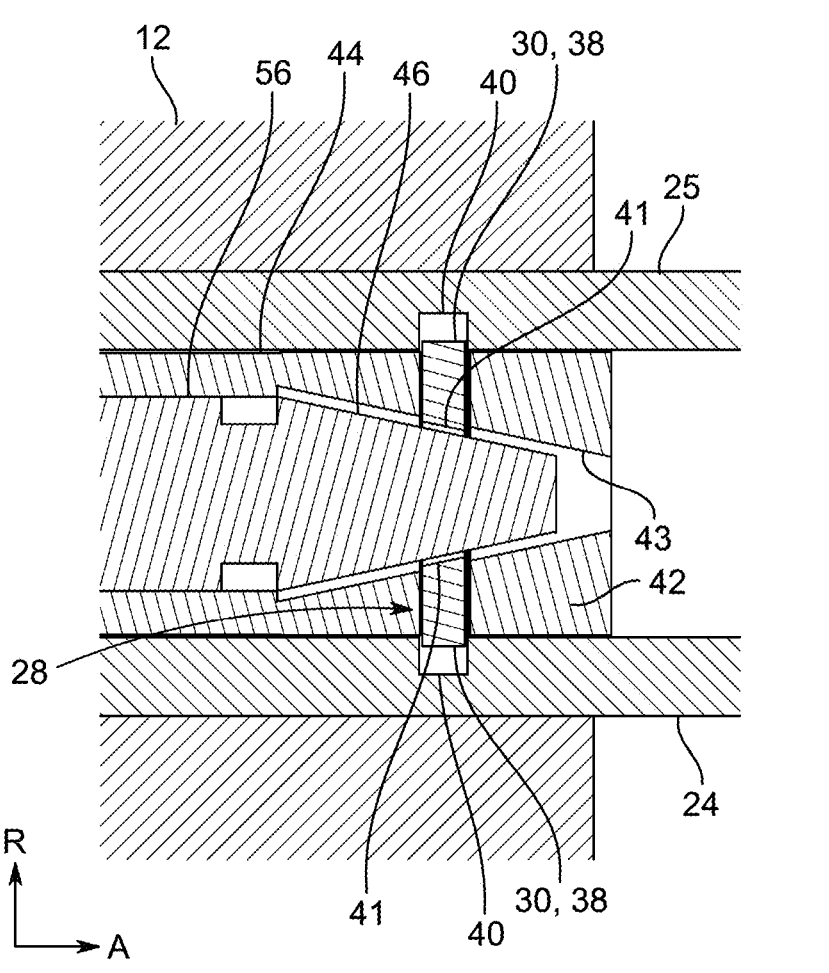
FIG. 2B shows an enlargement of a portion of FIG. 2A.

The vacuum valve 10 according to the second embodiment of the invention shown in FIGS. 2A and 2B essentially differs from the vacuum valve 10 described with reference to FIGS. 1A to 1C in that the locking element 30 comprises one or more pins 38 instead of clamping jaws 34. The pins 38 are disposed inside a distal end section 42 of the hollow shaft 44.

Recesses 40 for accommodating the pins 38 in the locked position is formed on an inner surface of the hollow portion 25 of the valve shaft 24. The dimension of the recess 40 is complementary to the dimension of the pins 38. The pins 38 feature an inclined surface 41 that is complementary to the conical portion 46 of the actuation shaft 56. The distal end section 42 of the hollow shaft 44 has an inclined inner surface 43 that is complementary to the conical portion 46 of the actuation shaft 56 as well. It can be envisaged that an supporting clamping force is created when shaft 56 is pressed against surface 43 by bending parts of section 42 outwardly. However, the interior of end section 42 may be dimensioned such that surface 43 and portion 46 do not interact or that end section forms a mechanical stop that limits the axial movement of shafts 44, 56.

When the actuation shaft 56 is moved in the axial direction A into the hollow shaft 44 and the valve shaft 24, the pins 38 are moved outwardly in the radial direction R by the conical portion 46 until the conical portion 46 comes into contact with the inclined inner surface 43 of the hollow shaft 44. In this locking position, at least a portion of the pins 38 is located inside the recess 40, while the remainder of the pins 38 is located in the hollow shaft 44. As a result, the valve shaft 24 is secured to the hollow shaft 44.

In the first and second embodiments of the invention described with reference to FIGS. 1A-1C and 2A and 2B, respectively, a frictional or form-fit connection for securing the valve body 18 in the locking position is formed on the inner surface portion 36 of the valve shaft 24. However, a configuration is also conceivable in which one or both of said connections are formed on an outside surface portion of the valve shaft 24.

Figure 3B:
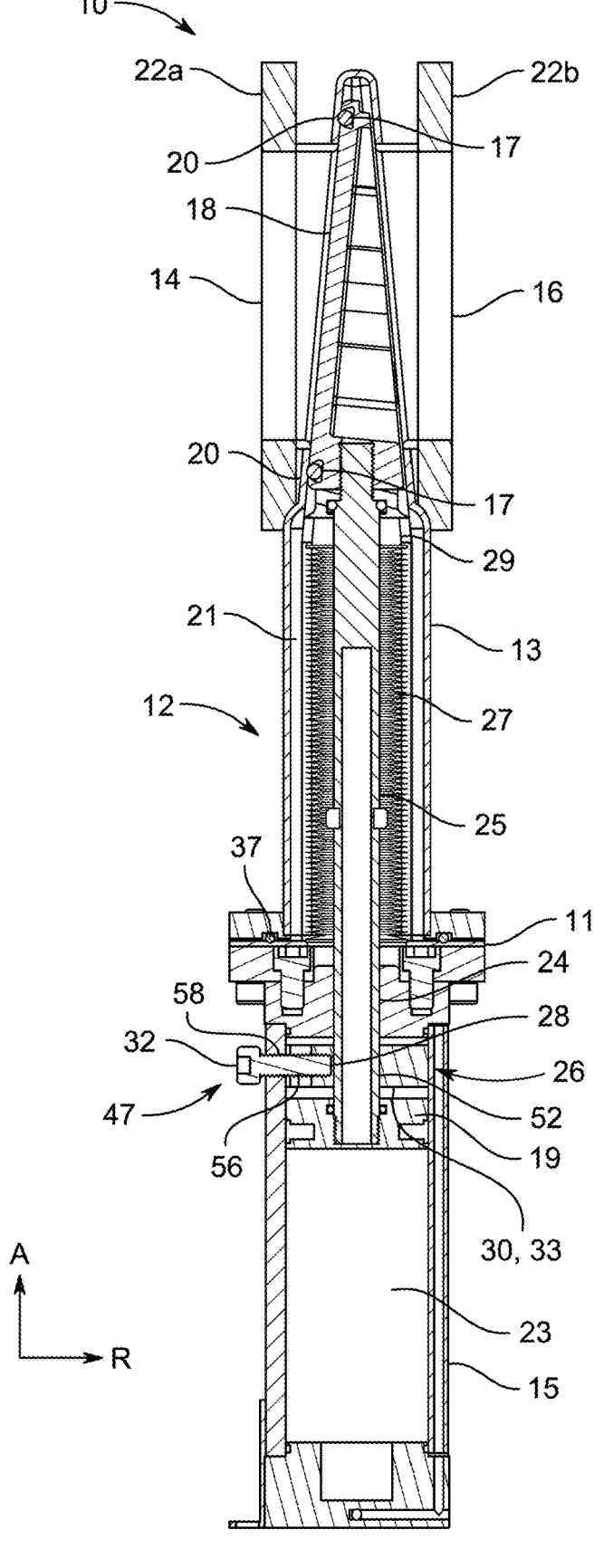
FIG. 3B shows a cross-section of the vacuum valve according to FIG. 3A.
Figure 3C:
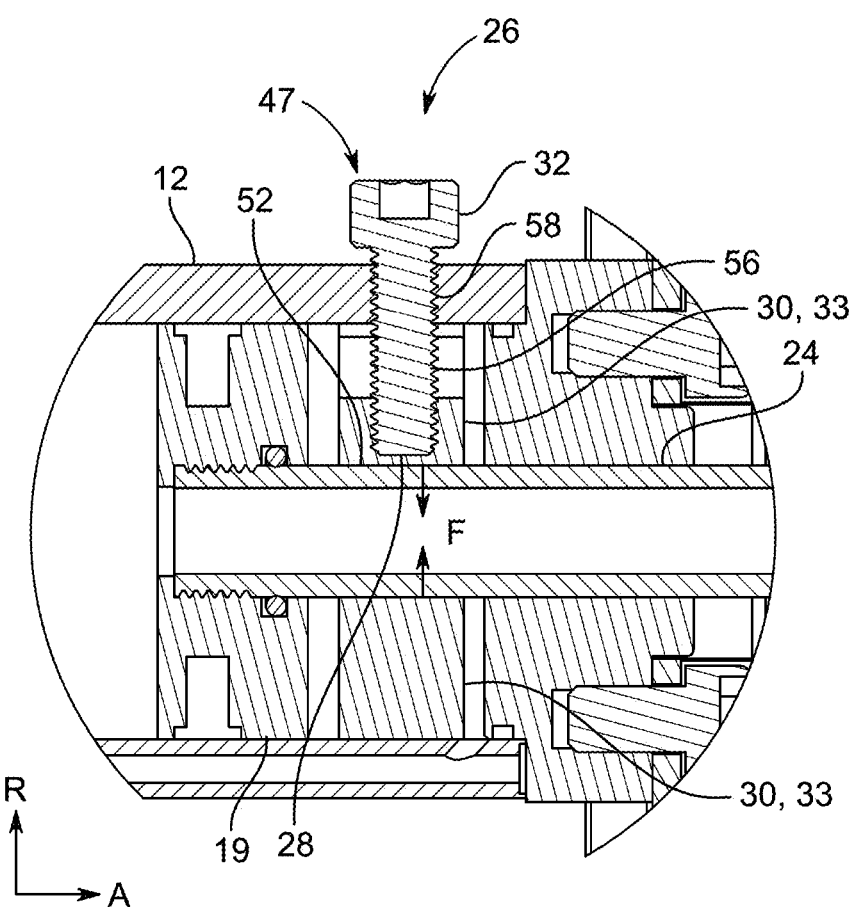
FIG. 3C shows an enlargement of a portion of FIG. 3B.

The vacuum valve 10 according to the third embodiment of the invention illustrated in FIGS. 3A-3C essentially differs from the vacuum valves 10 shown with reference to FIGS. 1A-2B in that the locking unit 26 comprises a bracket clamp 33 that can be tightened around the valve shaft 24 by operating a screw 47. FIG. 3C shows the bracket clamp 33 in the locking position. The bracket clamp 33 extends at least partially in the circumferential direction of shaft 24 and is arranged coaxially with the valve shaft 24. At least a part of the bracket clamp 33 is fixed to the valve housing 12, such that the clamp 33 provides an anchor point for the valve shaft 24 when clamp 33 is locked.

The screw 47 comprises a screw head/actuating element 32 that can be operated by a screw driver or the like, a screw body/actuation shaft 56 with an external thread 58 cooperating with an internal thread of the valve housing 12 and/or the bracket clamp 33 (not shown), and a distal end surface of the actuation shaft 56 being a locking mechanism 28. When the actuation shaft 56 is turned by operating the actuating element 32, the locking mechanism 28 urges the bracket clamp 33 towards the outer surface portion 52 of the valve shaft 24. In this locking position, a clamping force Facts on the valve shaft 24 and creates a frictional connection between the bracket clamp 33 and the valve shaft 24.

Additionally or alternatively, the locking unit 26 may be realized by a collate clamp, a shutter clamp and/or an iris clamp (not shown). Also, it is possible to dispose two or more clamps along the axial direction A around the valve shaft 24.

The vacuum valve 10 according to an embodiment of the invention comprises a resetting mechanism for moving the locking element 30 in the radial direction R away from the valve shaft 24. For example, the resetting mechanism comprises an elastic element disposed between the base of the recess 40 and the pin 38 (not shown). The resetting mechanism may however also be formed by the (bracket) clamp 33 itself, wherein such a clamp is pretensioned such that it opens when the actuation shaft 56 is moved away from the valve shaft 24.

It is possible to combine the different locking concepts described above. For example, the vacuum valve 10 may be equipped with the clamping jaw(s) 34, the pin(s) 38 and/or the (bracket) clamp for making the vacuum valve 10 even more reliable.

REFERENCE SIGNS

10 vacuum valve
11 flange connection
12 valve housing
13 top member
14 first opening
15 bottom member
16 second opening
17 seal
18 valve body
19 piston
20 seat
21 chamber
22*a*, 22*b* flange section
23 chamber
24 valve shaft
25 hollow portion
26 locking unit
27 bellows
28 locking mechanism
29 axial projection
30 locking element
31 distal end
32 actuating element
33 bracket clamp
34 clamping jaw
35 actuation unit
36 inner surface portion
37 seal

38 handle
39 hollow portion
40 recess
41 inclined surface
42 distal end section
43 inclined inner surface
44 hollow shaft
45 screw body
46 conical portion
47 screw
52 outer surface portion
54 conversion mechanism
56 actuation shaft
58 thread
60 thread
A axial direction
R radial direction
F clamping force

The invention claimed is:

1. A vacuum valve for a medium-, high-and/or ultra-high vacuum system, the vacuum valve comprising:
   a valve housing defining a passage connecting a first opening and a second opening of the valve housing,
   a valve body and a complementary seat, the valve body comprising a valve shaft extending in an axial direction and being actuable to move the valve body between an open position and a closed position, wherein the valve body cooperates with the seat in the closed position so as to close the passage gas-tightly, and
   a locking unit configured to secure the valve body in a locked position, wherein the locking unit comprises a locking mechanism configured to urge, upon actuation of the locking unit, at least one locking element in a radial direction disposed in a plane perpendicular to the axial direction towards the valve shaft to assume a locking position,
   wherein the locking unit is actuable by a rotatable actuating element,
   wherein the locking unit comprises a conversion mechanism disposed between the actuating element and the locking mechanism and configured to convert a rotary movement of the actuating element into a linear movement of the locking mechanism,
   wherein the conversion mechanism comprises an actuation shaft with a thread, and
   wherein the actuation shaft and the valve shaft are arranged co-axially.

2. The vacuum valve according to claim 1, wherein, when the valve body is in the locked position, a form-fit connection exists between the locking element and the valve shaft.

3. The vacuum valve according to claim 1, wherein the rotatable actuating element is configured to be manually operated.

4. The vacuum valve according to claim 1, wherein the locking element is urged towards an inner surface portion of the valve shaft by the locking mechanism upon actuation of the locking unit.

5. The vacuum valve according to claim 1, wherein at least a portion of the locking element is moved into a recess disposed on the valve shaft by the locking mechanism upon actuation of the locking unit.

6. The vacuum valve according to claim 1, wherein the locking mechanism comprises at least one inclined surface configured to cooperate with a complementary inclined surface of the locking element.

7. The vacuum valve according to claim 1,
wherein the locking unit comprises a resetting mechanism configured to move the locking element from the locking position into an unlocking position.

8. The vacuum valve according to claim 1,
wherein at least one component of the locking unit is secured to the valve housing.

9. The vacuum valve according to claim 1,
wherein the locked position corresponds to the open position or the closed position of the valve body.

10. A vacuum valve for a medium-, high-and/or ultra-high vacuum system, the vacuum valve comprising:

a valve housing defining a passage connecting a first opening and a second opening of the valve housing, a valve body and a complementary seat, the valve body comprising a valve shaft extending in an axial direction and being actuable to move the valve body between an open position and a closed position, wherein the valve body cooperates with the seat in the closed position so as to close the passage gas-tightly, and a locking unit configured to secure the valve body in a locked position, wherein the locking unit comprises a locking mechanism configured to urge, upon actuation of the locking unit, at least one locking element in a radial direction disposed in a plane perpendicular to the axial direction towards the valve shaft to assume a locking position, wherein the locking unit is actuable by a rotatable actuating element, wherein the locking unit comprises a conversion mechanism disposed between the actuating element and the locking mechanism and configured to convert a rotary movement of the actuating element into a linear movement of the locking mechanism, wherein the conversion mechanism comprises an actuation shaft with a thread, and wherein the locking unit comprises a hollow shaft with a thread that cooperates with the thread of the actuation shaft.

11. The vacuum valve according to claim 10,
wherein the hollow shaft and the valve shaft are arranged coaxially.

12. The vacuum valve according to claim 10,
wherein, when the valve body is in the locked position, a form-fit connection exists between the locking element and the valve shaft.

13. The vacuum valve according to claim 10,
wherein the rotatable actuating element is configured to be manually operated.

14. The vacuum valve according to claim 10,
wherein the locking element is urged towards an inner surface portion of the valve shaft by the locking mechanism upon actuation of the locking unit.

15. The vacuum valve according to claim 10,
wherein at least a portion of the locking element is moved into a recess disposed on the valve shaft by the locking mechanism upon actuation of the locking unit.

16. The vacuum valve according to claim 10,
wherein the locking mechanism comprises at least one inclined surface configured to cooperate with a complementary inclined surface of the locking element.

17. The vacuum valve according to claim 10,
wherein the locking unit comprises a resetting mechanism configured to move the locking element from the locking position into an unlocking position.

18. The vacuum valve according to claim 10,
wherein at least one component of the locking unit is secured to the valve housing.

19. The vacuum valve according to claim 10,
wherein the locked position corresponds to the open position or the closed position of the valve body.

* * * * *